(12) United States Patent
Ha

(10) Patent No.: US 10,521,241 B1
(45) Date of Patent: Dec. 31, 2019

(54) PREVENTING UNAUTHORIZED POWERING OFF OF MOBILE DEVICES

(71) Applicant: Long Van Ha, Walnut, CA (US)

(72) Inventor: Long Van Ha, Walnut, CA (US)

( * ) Notice: Subject to any disclaimer, the term of this patent is extended or adjusted under 35 U.S.C. 154(b) by 135 days.

(21) Appl. No.: 15/499,672

(22) Filed: Apr. 27, 2017

Related U.S. Application Data

(63) Continuation-in-part of application No. 14/545,718, filed on Jul. 18, 2014, now abandoned.

(60) Provisional application No. 61/860,718, filed on Jul. 31, 2013.

(51) Int. Cl.
| | |
|---|---|
| *G05B 19/00* | (2006.01) |
| *G06F 9/4401* | (2018.01) |
| *G06F 21/36* | (2013.01) |
| *G06F 21/88* | (2013.01) |

(52) U.S. Cl.
CPC .............. *G06F 9/442* (2013.01); *G06F 21/36* (2013.01); *G06F 21/88* (2013.01)

(58) Field of Classification Search
CPC . H04W 12/06; H04W 25/0274; H04W 64/00; G06G 21/88; G06F 21/81; G06F 21/32; Y02D 70/164; H04L 63/0861
USPC .......................................................... 726/19
See application file for complete search history.

(56) References Cited

U.S. PATENT DOCUMENTS

| | | | | |
|---|---|---|---|---|
| 2006/0282633 | A1* | 12/2006 | Iwai ....................... | G06F 21/575 |
| | | | | 711/163 |
| 2010/0099383 | A1* | 4/2010 | Yamagishi ............ | H04M 1/673 |
| | | | | 455/411 |
| 2012/0001725 | A1* | 1/2012 | Chen .................... | H04L 63/0492 |
| | | | | 340/5.6 |

* cited by examiner

*Primary Examiner* — Brandon S Hoffman
*Assistant Examiner* — Nega Woldemariam
(74) *Attorney, Agent, or Firm* — Plager Schack LLP; Mark H. Plager; Stephen Halberg

(57) ABSTRACT

An added security feature on a mobile device to require an owner or an authorized user of the mobile device to provide a shutdown password to power off the mobile device is disclosed. The shutdown password is configured and set by the owner or the authorized user and stored internally in a data storage device of the mobile device. When so configured, the mobile device triggers a shutdown password input field to be displayed on the mobile device screen. The user of the mobile device must provide the shutdown password in order to power off the mobile device, thereby preventing unauthorized powering off of the mobile device and associated GPS and internal communications circuitry of the mobile device, allowing the mobile device to be tracked in the event of an emergency or when the mobile device is lost or stolen.

13 Claims, 10 Drawing Sheets

PREVENTING UNAUTHORIZED POWERING OFF OF MOBILE DEVICES

CLAIM OF BENEFIT TO PRIOR APPLICATION

This application is a continuation-in-part (CIP) application of and claims benefit to U.S. Non-Provisional patent application Ser. No. 14/545,718, filed Jul. 18, 2014, which claimed benefit to U.S. Provisional Patent Application 61/860,718, filed Jul. 31, 2013. The U.S. Non-Provisional patent application Ser. No. 14/545,718 is incorporated herein by reference.

BACKGROUND

Embodiments of the invention described in this specification relate generally to preventing unauthorized mobile device operations, and more particularly, to methods for preventing unauthorized powering off of mobile devices.

Mobile devices typically are powered down by any of several manners, including a human user selecting a user interface (UI) option to shut down, by (the owner) configuring the mobile device to automatically power off after a certain amount of time of inactivity, or by holding a hardware button on the mobile device for a certain amount of time. When mobile devices are powered off, shut down, switched off, or turned off, the power is disabled for any internal geolocation positioning system (GPS) tracking electronics and/or wireless electronic circuitry. This includes the ability of the mobile device to send wireless signals. In other words, when the mobile device is shut down and the power is off, the ability to send any wireless signals is severed.

None of the existing mobile devices—including, without limitation, cellular phones, smartphones, tablet computing devices, etc.—prevent the mobile device from being powered off at any time by any person. However, powering off of a mobile device gives rise to a problem in locating the device in times of need, such as if the mobile device is stolen (or lost and powered down by an opportunistic finder of the mobile device) or if a location of a person using the mobile device needs to be known, etc. Adding to this problem is the fact that it is well known that a lost or stolen mobile device cannot be tracked or located when the mobile device is powered off by intentional shutdown or removal of the device battery.

Therefore, what is an additional systematic option to prevent unauthorized power-off or shutdown of mobile devices in order to prevent the intentional disabling of internal GPS tracking capabilities and/or wireless electronic circuitry.

BRIEF DESCRIPTION

An authenticating mobile device shutdown process for preventing unauthorized powering off of a mobile device and fake password processes for providing a fake password and rendering an appearance of shutting down when powering off of a mobile device is attempted without authorization are disclosed.

In some embodiments, the authenticating mobile device shutdown process for preventing unauthorized powering off of the mobile device which disables internal geolocation positioning system (GPS) tracking capabilities and wireless electronic circuitry of the mobile device. In some embodiments, the authenticating mobile device shutdown process requires a password to be input before enabling a user in powering off the mobile device. In some embodiments, the authenticating mobile device shutdown process performs an authentication check on the password. In some embodiments, the authentication check includes decrypting a stored encrypted password and comparing the decrypted password with a user-input password for shutting down the mobile device.

In some embodiments, the authenticating mobile device shutdown process is associated with a systematic option built within the mobile device to prevent unauthorized powering off of the mobile device. In some embodiments, the systematic option requires a human operator of the mobile device to use a private and secure password, or encrypted password, or any other authentication method to validate the power-off option. The same secured method is currently being used to power-on many mobile devices available in the current market.

In some embodiments, the fake password processes include a password-based fake mobile device shutdown process for rending an appearance of shutting down when powering off of the mobile device attempted with a fake password.

In some embodiments, the fake password processes include a password-based alert signaling fake mobile device shutdown process for sending a wireless alert signal to an authority while rending an appearance of shutting down when powering off of the mobile device attempted with a fake password.

In some embodiments, the fake password processes include a hardware override fake mobile device shutdown process for rending an appearance of shutting down when powering off of the mobile device attempted by holding a hardware button down for a period of time in an effort to override password protections.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
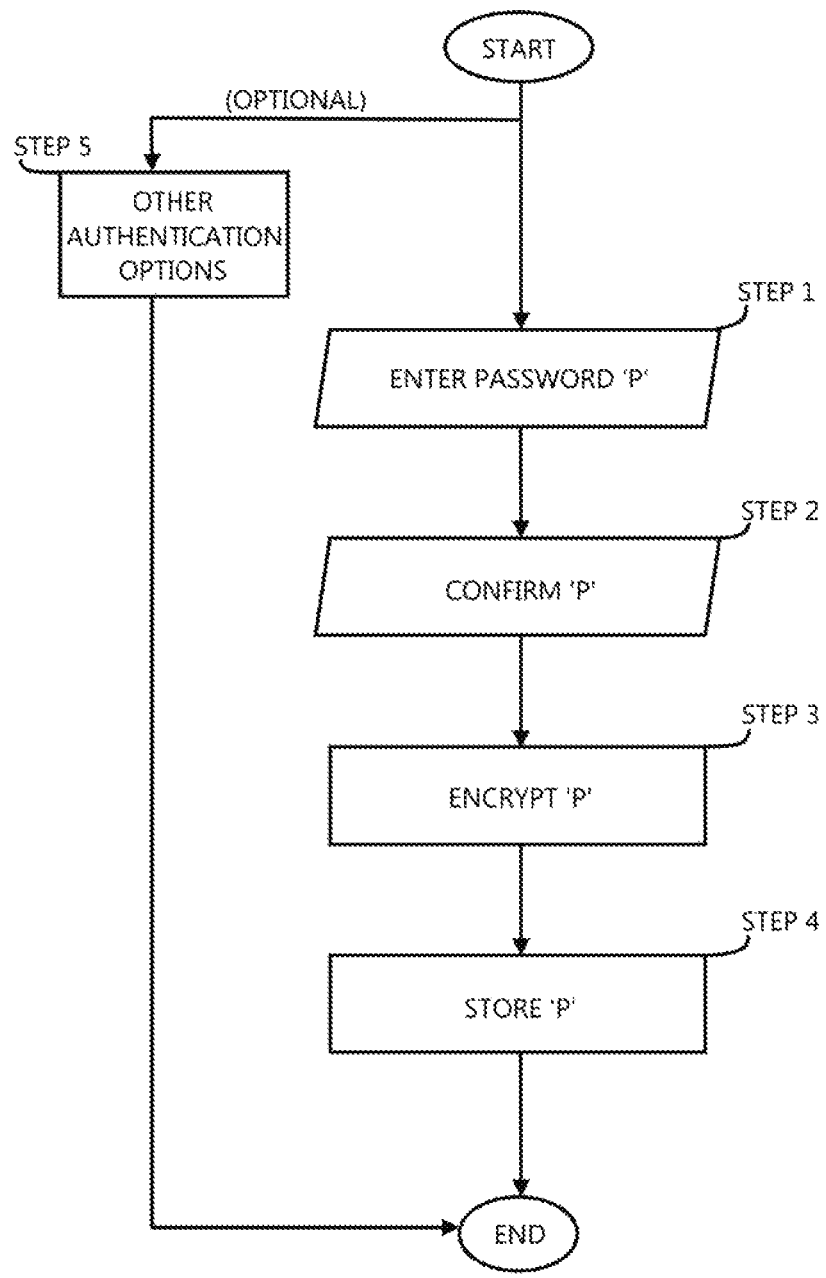
FIG. 1 conceptually illustrates a flow chart of a password set-up for power-off authentication process in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

For purposes of the inventive embodiments described in this specification, a lexicography is included here to define some terms and terminology used throughout the description. Specifically, the terms "unauthorized user" and "unauthorized person" refer to a human operator of a mobile device who intend to deprive at least one other person access or possession of the mobile device. An unauthorized person or user may include, therefore, persons involved in theft of the mobile device, persons who receive the mobile device with knowledge that the mobile device was stolen, and persons who misappropriate the mobile device for personal use, and those persons who find the mobile device when the mobile device was lost but have no intention of returning the mobile device. Furthermore, the term "mobile device" includes any of several electronic mobile devices that include GPS features. Examples of an electronic mobile device include, without limitation, cellular phones, smart phones, tablet computing devices, etc. Additionally, the term "password" includes any of several verifiable user-inputs which can be checked to authenticate the identity of the user, including, without limitation, the following examples of "passwords" that are acceptable to prevent unauthorized powering off of a mobile device: (i) text-based passwords, which include both alphabetical, numerical, and special characters (hereinafter referred to as an "alpha-numeric" sequence or as an "alpha or numeric" sequence, (ii) a hand drawn pattern (input by finger gesture, stylus input, etc.), (iii) iris imaging, and (iv) a fingerprint.

Some embodiments of the invention include an authenticating mobile device shutdown process for preventing unauthorized powering off of the mobile device which disables internal GPS tracking capabilities and wireless electronic circuitry of the mobile device. In some embodiments, the authenticating mobile device shutdown process requires a password to be input before enabling a user in powering off the mobile device. In some embodiments, the authenticating mobile device shutdown process performs an authentication check on the password. In some embodiments, the authentication check includes decrypting a stored encrypted password and comparing the decrypted password with a user-input password for shutting down the mobile device.

In some embodiments, the authenticating mobile device shutdown process is associated with a systematic option built within the mobile device to prevent unauthorized powering off of the mobile device. In some embodiments, the systematic option requires a human operator of the mobile device to use a private and secure password, or encrypted password, or any other authentication method to validate the power-off option. The same secured method is currently being used to power-on many mobile devices available in the current market.

In this specification, there are descriptions of processes or methods that are performed by software running on one or more mobile devices or mobile computing devices (e.g., mobile phones, smartphones, tablet computing devices, etc.) to prevent unauthorized mobile device shutdown and to provide an appearance of powering off a mobile device when unauthorized mobile device shutdown is attempted. In some cases, multiple software modules are deployed on multiple computing devices (e.g., the password-based alert signaling fake mobile device shutdown process is performed by the mobile device which sends a signal to a computing device of an authority which may receive the signal over a local network or over a cloud computing service), thereby allowing the mobile device to be positioned at a geolocation that is different from the geolocation at which the authority computing device is positioned. Similarly, the mobile device can be tracked externally because the mobile device can routinely request and receive GPS coordinates which allow a computing device of an external entity to identify a geolocation at which the mobile device is present. However, it should be noted that for the purposes of the embodiments described in this specification, the word "method" is used interchangeably with the word "process". Methods are described, therefore, by reference to example processes that conceptually illustrate process steps for preventing unauthorized mobile device shutdown and for providing an appearance of powering off a mobile device when unauthorized mobile device shutdown is attempted.

As stated above, when mobile devices are powered off, shut down, switched off, or turned off, the power available to any internal GPS tracking electronics and/or electronic wireless circuitry is lost. As such, unauthorized powering off prevents the misplaced or lost or stolen mobile devices from being located. None of the existing mobile devices include options to prevent unauthorized powering off of the mobile device. In particular, none of the existing mobile devices include password protection to prevent unauthorized powering off of the mobile device. Without password protection, thieves can easily turn off stolen mobile devices, making it difficult or impossible to find them. Other unauthorized users can power down the mobile device in order to shut down the internal GPS tracking features and/or wireless electronic circuitry.

Embodiments of the authenticating mobile device shutdown process and the feigned shutdown methods described in this specification solve such problems by an additional systematic authentication-based mobile device powering off option of mobile devices to prevent unauthorized operators to power-off or shutdown these mobile devices so as to disable internal GPS tracking capabilities and/or wireless electronic circuitry. This systematic authentication-based mobile device powering off option enables legitimate interested persons, including the owner of the device, a designated user of the device, private entities (e.g., the manufacturer of the mobile device), and government entities, such as local, state, or federal law enforcement agencies, to locate reported missing persons or persons of interest during the course of a criminal investigation, so long as the battery retains some power for the mobile device. Furthermore, this systematic authentication-based mobile device powering off option provides the owner of the mobile device enhanced ability to regain possession of the mobile device if stolen or lost. The systematic authentication-based mobile device powering off option also serves as a theft deterrent, since GPS features of a mobile device would remain in force for some time after the theft of the mobile device is completed (e.g., stolen from a vehicle, from a residence, or from a commercial establishment, etc.).

The systematic authentication-based mobile device powering off option of the present disclosure may be comprised of the following elements. This list of possible constituent elements is intended to be exemplary only and it is not intended that this list be used to limit the systematic authentication-based mobile device powering off option of the present application to just these elements. Persons having ordinary skill in the art relevant to the present disclosure may understand there to be equivalent elements that may be substituted within the present disclosure without changing the essential function or operation of the systematic authentication-based mobile device powering off option.

1. Set up encrypted password.
2. Store encrypted password in mobile device's non-volatile memory.
3. An extra option is added in the sequence of powering off mobile device.
4. User is prompted to enter password.
5. The entered password is compared against the decrypted stored password.
6. Only correct password will finish the powering off sequence.

By way of example, FIG. 1 conceptually illustrates a flow chart of password set-up for power-off authentication in some embodiments. The flow chart of password set-up for power-off authentication includes several steps for completing password set-up for power-off authentication.

Step 1 depicts the display screen with prompt "Enter Password".

Step 2 depicts the display screen with prompt "Confirm Password".

Step 3 depicts the programming function involving the scrambling/encrypting of the password.

Step 4 depicts the programming function involving the storing of the password.

Step 5 depicts other authentication options available for the device owner/authorized user.

In the flow chart of FIG. 1, the steps of 1 and 2 depict user-action required steps in the Password Authentication process. This process for setting-up the password should be made available in the "Setting" mode of the mobile device, and under "Security" set-up. Once the user has chosen the option to set-up the password powering-off (or shutdown password), a screen will appear to prompt the user to enter the password [Step 1], choosing one of the following: 1) alpha or numeric sequence, 2) hand drawn pattern, 3) iris imaging, or 4) fingerprint. Once the user has entered one of the four choices, a screen will appear for the user to re-enter the password entered in [Step 2] for verification.

Steps 3 and 4, as shown in the flow chart of FIG. 1, depict internal system programming requirements and no action is required by the user. The mobile device's internal system will encrypt/scramble [Step 3] and store [Step 4] the password after the password has been entered [Step 1] and re-verified [Step 2] by the user.

Step 5 depicts other options available to the user (such as setting up password for powering on, etc.), along with this Power-off Password Authentication process.

Figure 2:
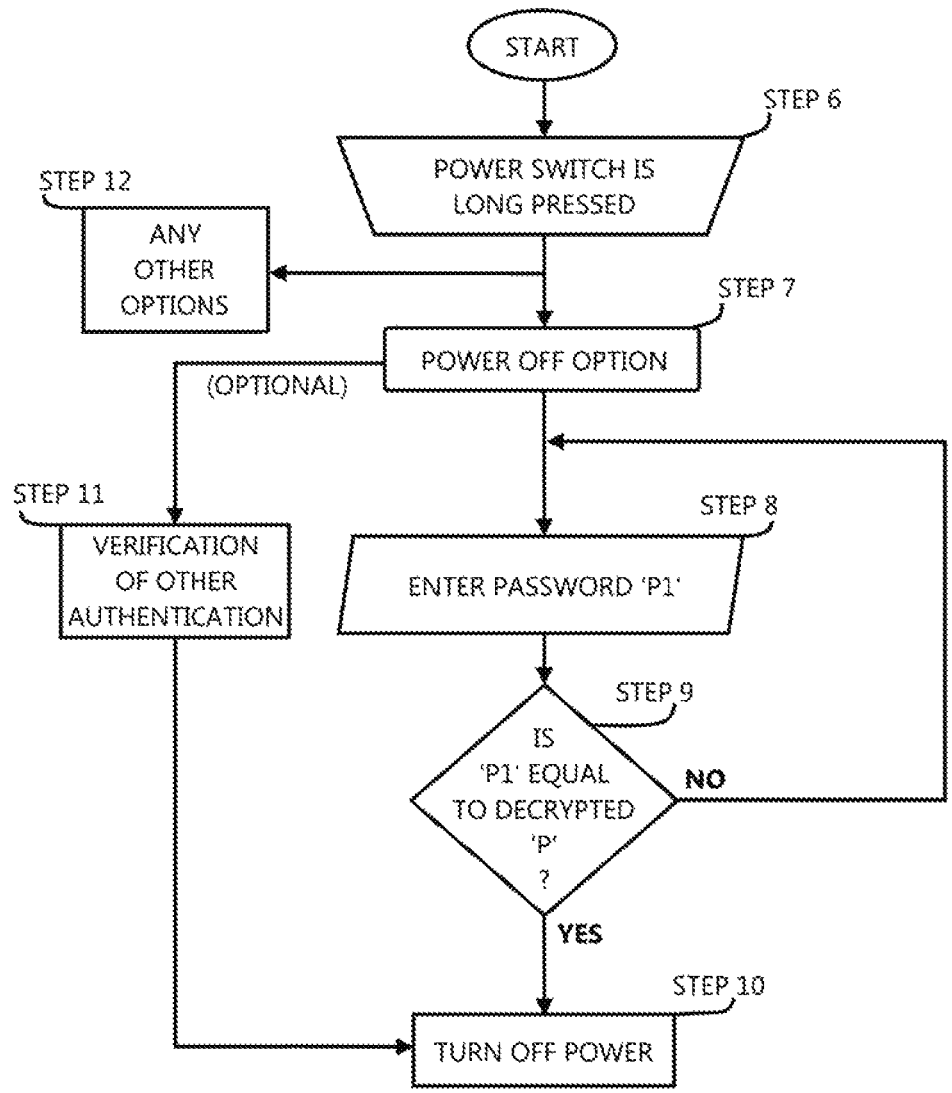
FIG. 2 conceptually illustrates a flow chart of an authentication of power-off operation with password process in some embodiments.

In a further example, FIG. 2 conceptually illustrates a flow chart of authentication of power-off operation with password in some embodiments. The flow chart of authentication of power-off operation with password includes several steps which follow (starting at Step 6) the steps of the flow chart described above by reference to FIG. 1.

Step 6 depicts the initial powering-off with password required (after the password has been set up).

Step 7 depicts the display screen showing user's options including powering off.

Step 8 depicts the display screen prompting the user to enter the [stored/encrypted] password.

Step 9 depicts the programming decrypting and verification/matching between the stored/encrypted password and the password entered by the user during the step depicted in Step 8.

Step 10: The mobile device is turned off/powered off once the password has been verified.

Step 11 depicts other authentication verification options that can be chosen by the user.

Step 12 depicts other options that can be chosen by the user.

The flow chart of FIG. 2 depicts the actual powering-off process after the user has set up the mobile device to require a password when it (the device) is being powered-off. When the user presses the power-off button on the device [Step 6], a screen will appear to provide the user with the "Power-off" option [Step 7] along with other options which each also require authentication verification [Step 11], such as "Airplane" Mode," "Restart," etc. Once the user has chosen the "Power-off" option, a screen will appear to prompt the user to enter the password [Step 8]. Subsequent to the user having entered the password, the mobile device's program system will compare the just-entered password against the stored/encrypted password. If both the entered password and the stored/encrypted password match each other, the mobile device then will turn itself off.

Embodiments of the authenticating mobile device shutdown process and the feigned shutdown methods described in this specification differ from and improve upon currently existing options. In particular, some embodiments differ because the systematic authentication-based mobile device powering off option requires a password to be input to authenticate the user as authorized (or not authorized) to power off the mobile device. In some embodiments, the password is compared to an encrypted password associated with authorized shutdown of the mobile device. The encrypted password is an initial authorization-proving password which a user of the mobile device enters during set-up and configuration of the systematic authentication-based mobile device powering off option. Set-up and configuration of the systematic authentication-based mobile device powering off option is described further below, by reference to FIGS. 3 and 4. By comparing the encrypted password to the password being input for shutdown of the mobile device, a real-time verification can quickly confirm whether the user is authorized or not authorized to power off the mobile device. Performing the authenticating mobile device shutdown process is described further below, by reference to FIGS. 5 and 6. In contrast to the systematic authentication-based mobile device powering off option provided in this disclosure, the existing mobile devices and options for mobile devices do not provide any manner of self-authentication to prevent unauthorized powering off the mobile device.

Several more detailed embodiments are described below. Section I describes authenticated mobile device shutdown for preventing unauthorized mobile device powering off. Section II describes password-based fake mobile device shutdown processes for rending an appearance of shutting down when powering off is attempted with a fake password. Lastly, Section III describes an electronic system that implements some embodiments of the invention.

I. Authenticated Mobile Device Shutdown

In some embodiments, the authenticating mobile device shutdown process for preventing unauthorized powering off of the mobile device which disables internal geolocation positioning system (GPS) tracking capabilities and wireless electronic circuitry of the mobile device. In some embodiments, the authenticating mobile device shutdown process requires a password to be input before enabling a user in powering off the mobile device. In some embodiments, the authenticating mobile device shutdown process performs an authentication check on the password. In some embodiments, the authentication check includes decrypting a stored encrypted password and comparing the decrypted password with a user-input password for shutting down the mobile device.

In some embodiments, the authenticating mobile device shutdown process is associated with a systematic option built within the mobile device to prevent unauthorized powering off of the mobile device. In some embodiments, the systematic option requires a human operator of the mobile device to use a private and secure password, or encrypted password, or any other authentication method to validate the power-off option. The same secured method is currently being used to power-on many mobile devices available in the current market.

Figure 3:
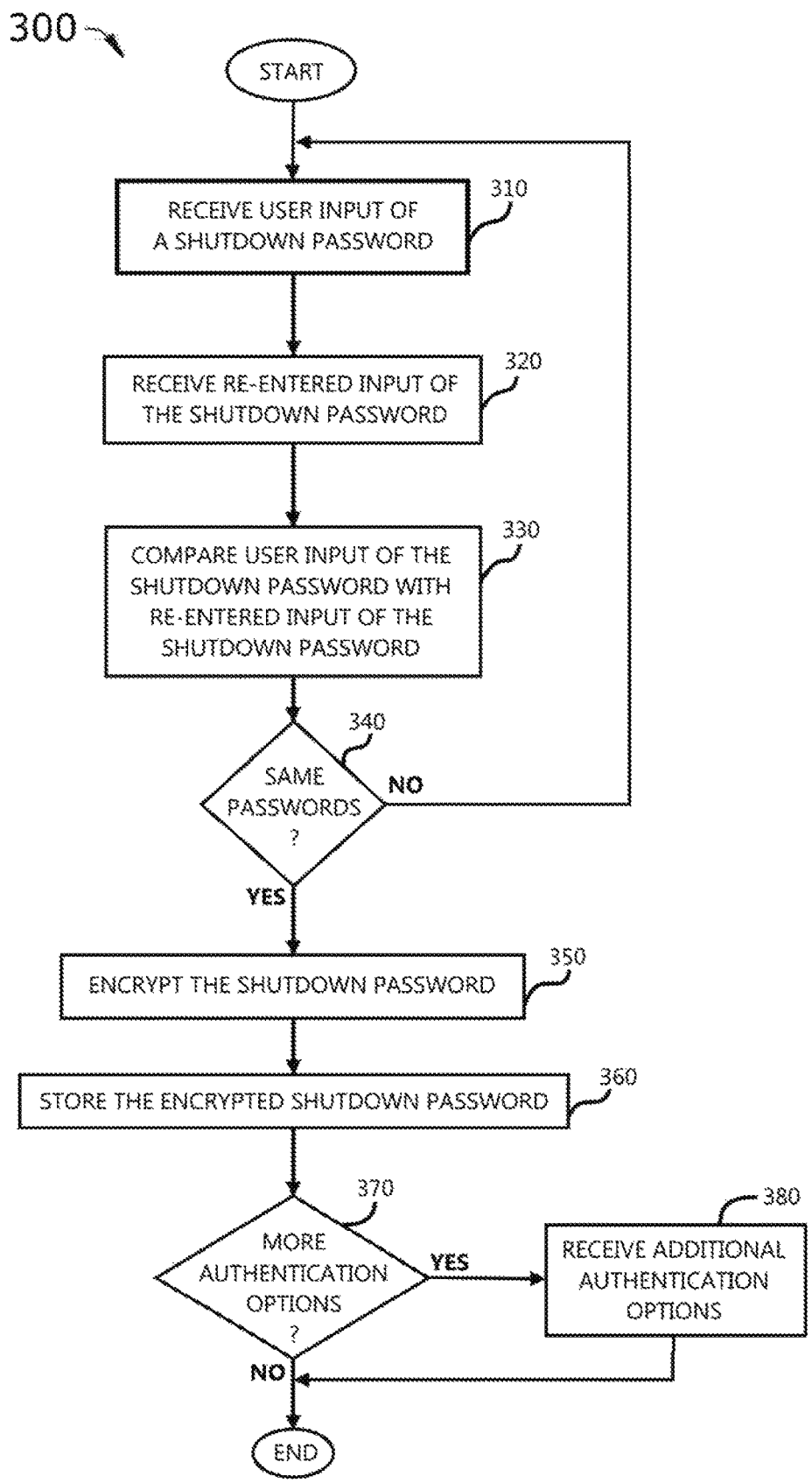
FIG. 3 conceptually illustrates a process for configuring a systematic authentication-based mobile device powering off option to prevent unauthorized powering off of a mobile device in some embodiments.

By way of example, FIG. 3 conceptually illustrates a process 300 for configuring a systematic authentication-based mobile device powering off option to prevent unauthorized powering off of a mobile device. Some of the steps in the process 300 are described by reference to FIG. 4, which conceptually illustrates a phase diagram 400 with four phases of configuring a systematic authentication-based mobile device powering off option to prevent unauthorized powering off of a mobile device. As shown in this figure, the phase diagram 400 demonstrates some of the steps of the process 300 over four phases 410-440. In the first phase 410, a user is interacting with a mobile device to configure a shutdown password in the security settings of the mobile device. As a person skilled in the relevant art would appreciate, configuration of a shutdown password can be accessed through different apps or configuration options, depending on the type of mobile device, the type of hardware devices associated with the mobile device, and/or the type of operating environment or operating system through which system-level, hardware-level, kernel-level, and user-level options can be configured, including a systematic authentication-based mobile device powering off option to prevent unauthorized powering off of the mobile device.

After the user selects, in the first phase 410, the option to create a shutdown password from the mobile device security settings, the mobile device displays several options for configuring a shutdown password. The example shown in the second phase 420 includes four types of shutdown passwords, including (i) an alpha-numeric password, (ii) a hand-drawn password, (iii) an iris scan password, and (iv) a fingerprint password. As noted above, the term password is not limited to only character-based words which are readable to a human, but is intended to include broader conceptions of secured access to powering off of devices only by validated user authentication, which in these examples includes user authentication by conventional alpha-numeric text input (inclusive of special characters, accents, punctuation marks, etc.), user authentication by hand-drawn pictures, hand-drawn symbols, hand-drawn signs, hand-drawn notations, etc., user authentication by iris scan of an authorized user's iris, and user authentication by fingerprint identification of the user.

While the user interacting with the mobile device shown in the second phase 420 could choose any one of the shutdown password options, or multiple types of shutdown password options, in this example, the user has selected configuration of an alpha-numeric password, as demonstrated by a touch gesture on the "alpha numeric" graphic. The user selection of the "alpha numeric" graphic starts an alpha-numeric text input tool in which the user can enter alpha-numeric characters to form a shutdown password.

Now turning to FIG. 3, the process 300 starts by prompting the user of the mobile device to enter a password for preventing unauthorized powering off of the mobile device. As shown in this figure, the process 300 receives (at 310) a shutdown password to be used when powering off the mobile device. The shutdown password may need to qualify in terms of complexity, length, combinations of characters, or in other ways. Thus, the software program that implements the process 300 may be configured to accept the entered password when the password satisfies certain criteria. In some embodiments, the process 300 prompts the user to re-enter the password. In some embodiments, the process 300 then receives (at 320) the re-entered password. In some embodiments, the process 300 compares (at 330) the re-entered password to the initially received shutdown password.

Next, the process 300 determines (at 340) whether the re-entered password and the initially received shutdown password are the same. When the re-entered password and the initially received shutdown password are the same, the process 300 transitions to step 350, as described further below. On the other hand, when the re-entered password and the initially received shutdown password are not the same, the process 300 returns to step 310 to receive a shutdown password (which can be different from or the same as the shutdown password the user previously thought he or she had entered). The next steps after returning to step 310 follow in sequence as already described above.

As noted above, when the re-entered password and the initially received shutdown password are the same, the process 300 of some embodiments encrypts (at 350) the shutdown password. Referring back to FIG. 4, the encryption step 350 in process 300 is demonstrated in the third phase 430. Specifically, the third phase 430 is a non-interactive step in which the user does not do anything. The encryption is an automatic sub-process which is launched after the user's initially entered shutdown password and re-entered shutdown password are compared and determined to be the same. Although the encryption example shown in the third phase 430 includes several lines of scrambled or arbitrary text, in some embodiments there is no display of anything during automatic encryption of the shutdown password.

Turning back to FIG. 3, in some embodiments, the process 300 stores (at 360) the encrypted shutdown password. The encrypted shutdown password can be stored in a data storage of the mobile device. The data storage of the mobile device can be encrypted in its entirety, which adds an additional layer of encryption to the already encrypted shutdown password. In other words, the data storage or database can be encrypted by its own right, while the shutdown password will also be automatically encrypted. When the encrypted password is stored in the encrypted data storage or database, therefore, multiple levels of encryption secure the shutdown password from hacking, unauthorized access, etc. The type and level of encryption used satisfies a high cyber-security standard for password encryption that at least prevents manual brute force attempts at decrypting the shutdown password.

Returning to FIG. 4, the fourth phase 440 of the phase diagram 400 demonstrates automatic saving of the encrypted shutdown password. Similar to the encryption operation of the third phase 430, storing the encrypted shutdown password in the fourth phase 440 is a non-interactive step in which the user does not do anything. The saving and storing of the encrypted shutdown password is an automatic sub-process which is launched after the automatic encryption sub-process is finished. Although the example of storing the encrypted password shown in the fourth phase 440 includes a graphic of a database (represented by a silo or a cylinder), in some embodiments there is no display of a database or anything else during automatic storage of the encrypted shutdown password.

Again referring back to FIG. 3, in some embodiments, the process 300 next determines (at 370) whether the user wishes to use one or more additional authentication options. When the user does not wish to use another authentication option, the process 300 of some embodiments ends. On the other hand, when the user wants to use another authentication option, the process 300 then receives (at 380) authentication data related to the other authentication option. Then the process 300 ends.

Figure 4:
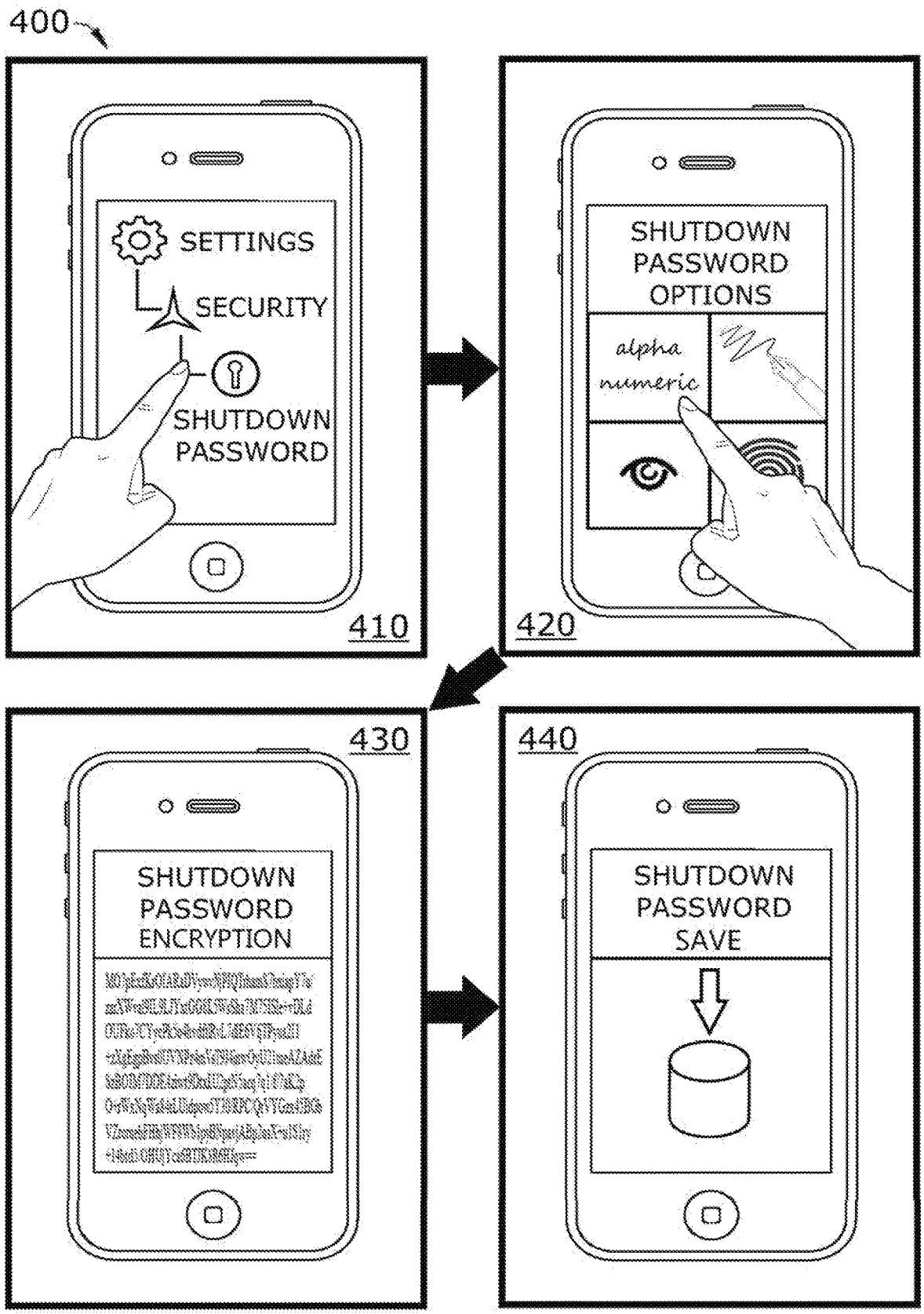
FIG. 4 conceptually illustrates four phases of configuring a systematic authentication-based mobile device powering off option to prevent unauthorized powering off of a mobile device in some embodiments.

While the examples described by reference to FIGS. 3 and 4 conceptually illustrate the set-up or configuration of a systematic authentication-based mobile device powering off option (or simply, shutdown password) to prevent unauthorized powering off of a mobile device, several of the following examples and figures focus on the shutdown password during regular usage.

Figure 5:
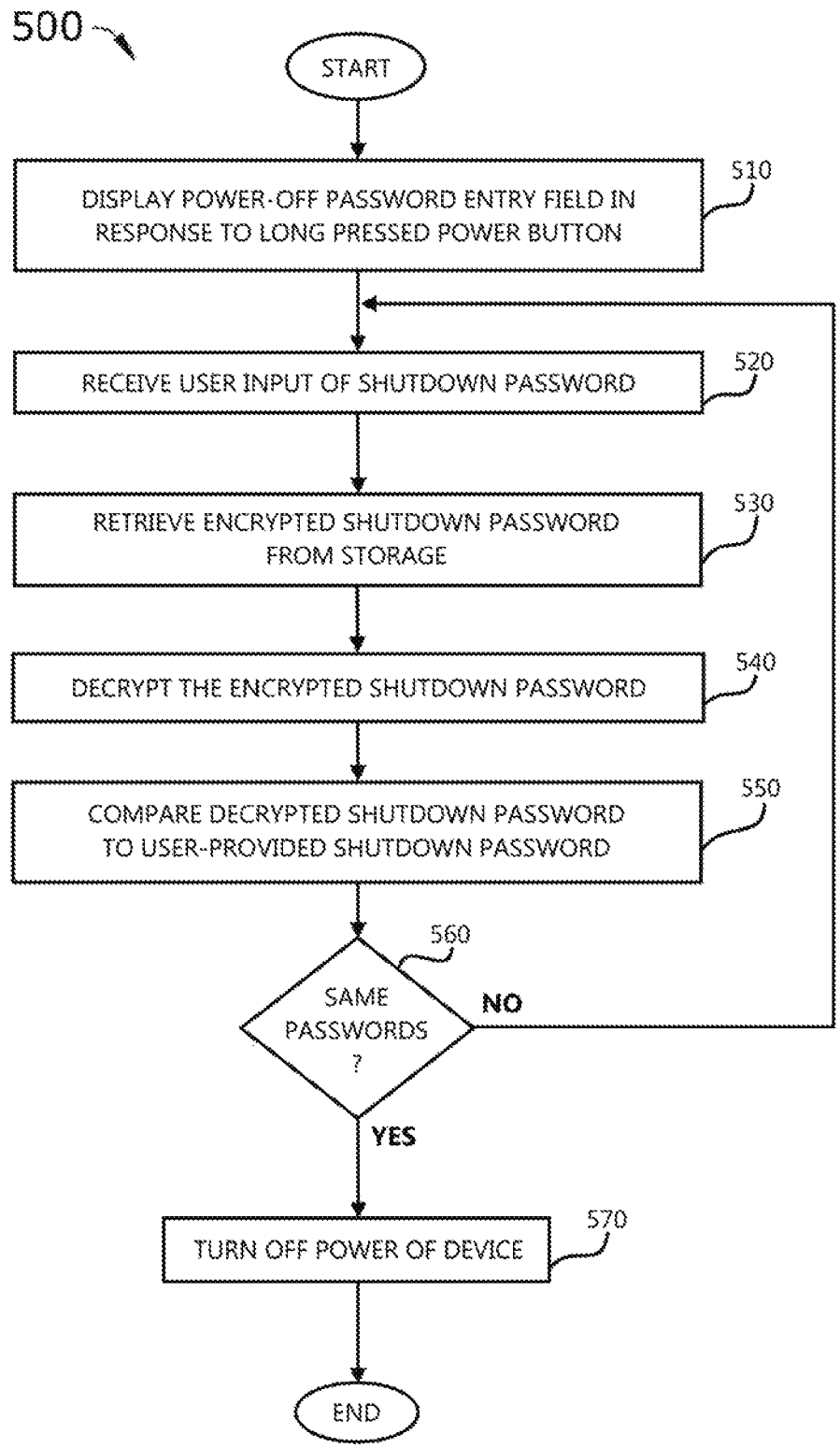
FIG. 5 conceptually illustrates an authenticating mobile device shutdown process for preventing unauthorized powering off of a mobile device in some embodiments.

Turning to another example, FIG. 5 conceptually illustrates an authenticating mobile device shutdown process 500 for preventing unauthorized powering off of a mobile device. Some of the steps in the authenticating mobile device shutdown process 500 are described by reference to FIG. 6, which conceptually illustrates a phase diagram 600 with four phases of authenticating a user trying to power off a mobile device. As shown in this figure, the phase diagram 600 demonstrates some of the steps of the authenticating mobile device shutdown process 500 over four phases 610-640. In the first phase 610, a user is holding a power switch button along the mobile device housing for a length of time (hereinafter referred to as "long pressed"). When the mobile device includes the systematic authentication-based mobile device powering off option to prevent unauthorized powering off of the mobile device, an authenticated powering offer validation check is performed before any power turns off. Thus, in some embodiments, the user's attempt to shut down the mobile device triggers the authenticating mobile device shutdown process 500 to start. Alternatively, a user of the mobile device can attempt to shut down the mobile device by using a graphical option in a user interface (UI) of the mobile device (instead of long pressing the power switch).

Now turning to FIG. 5, the authenticating mobile device shutdown process 500 triggers (at 510) a power off password entry graphical display to be shown on a screen of the mobile device. Next, the authenticating mobile device shutdown process 500 receives (at 520) a password entered by the user of the mobile device.

Figure 6:
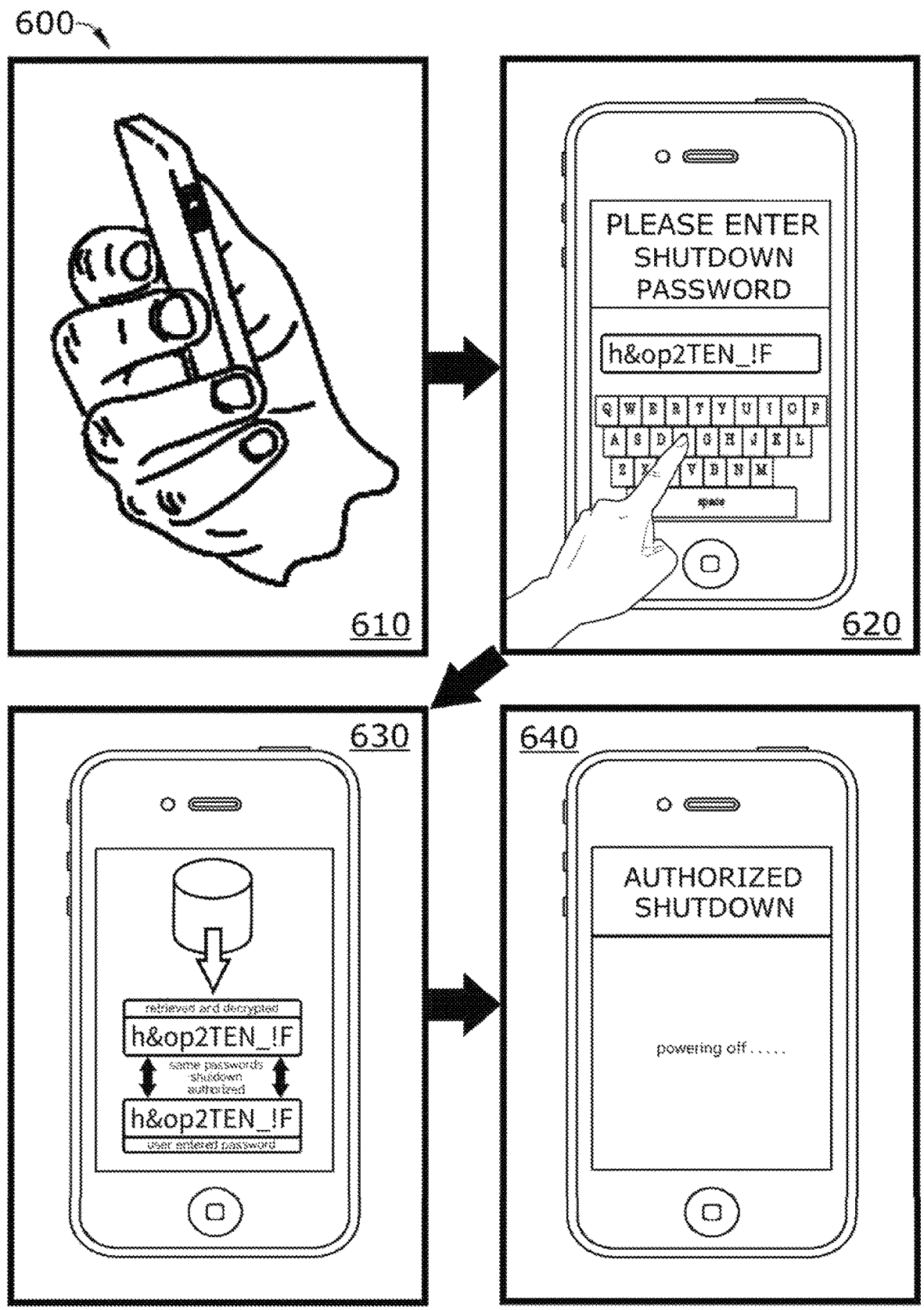
FIG. 6 conceptually illustrates four phases of authenticating a user trying to power off a mobile device in some embodiments.

Referring to FIG. 6, the second phase 620 demonstrates the user entering a shutdown password into a shutdown password authentication field.

Turning back to FIG. 5, in some embodiments, the authenticating mobile device shutdown process 500 retrieves (at 530) the encrypted password in the device storage.

By way of example, retrieval of the decrypted shutdown password from the database is demonstrated at the third phase 630 of FIG. 6 by the arrow pointing down from the database silo icon on the mobile device screen.

In some embodiments, the authenticating mobile device shutdown process 500 then decrypts (at 540) the encrypted password. After retrieval and decryption, the authenticating mobile device shutdown process 500 compares (at 550) the decrypted shutdown password to the user-entered password. In some embodiments, the authenticating mobile device shutdown process 500 then determines (at 560) whether the decrypted shutdown password is the same as the user-entered password.

By way of example, the comparison of the user-entered shutdown password and the retrieved, decrypted shutdown password is shown in the third phase 630 of FIG. 6.

When the decrypted shutdown password is not the same as the user-entered password, the authenticating mobile device shutdown process 500 returns to step 520 to receive a password entered by the user of the mobile device. On the other hand, when the decrypted shutdown password is the same as the user-entered password, the authenticating mobile device shutdown process 500 turns off (at 570) the power of the mobile device. Then the authenticating mobile device shutdown process 500 ends.

Finally, in reference back to FIG. 6, the authenticated shutdown and authorized powering off of the mobile device is demonstrated in the fourth phase 640 shown in FIG. 6.

II. Fake Password and Appearance of Mobile Device Shutdown

Some embodiments include fake password processes for providing a fake password and rendering an appearance of shutting down a mobile device. In some embodiments, the fake password processes include a password-based fake mobile device shutdown process for rending an appearance of shutting down when powering off of the mobile device attempted with a fake password.

In some embodiments, the fake password processes include a password-based alert signaling fake mobile device shutdown process for sending a wireless alert signal to an authority while rending an appearance of shutting down when powering off of the mobile device attempted with a fake password.

In some embodiments, the fake password processes include a hardware override fake mobile device shutdown process for rending an appearance of shutting down when powering off of the mobile device attempted by holding a hardware button down for a period of time in an effort to override password protections.

Figure 7:
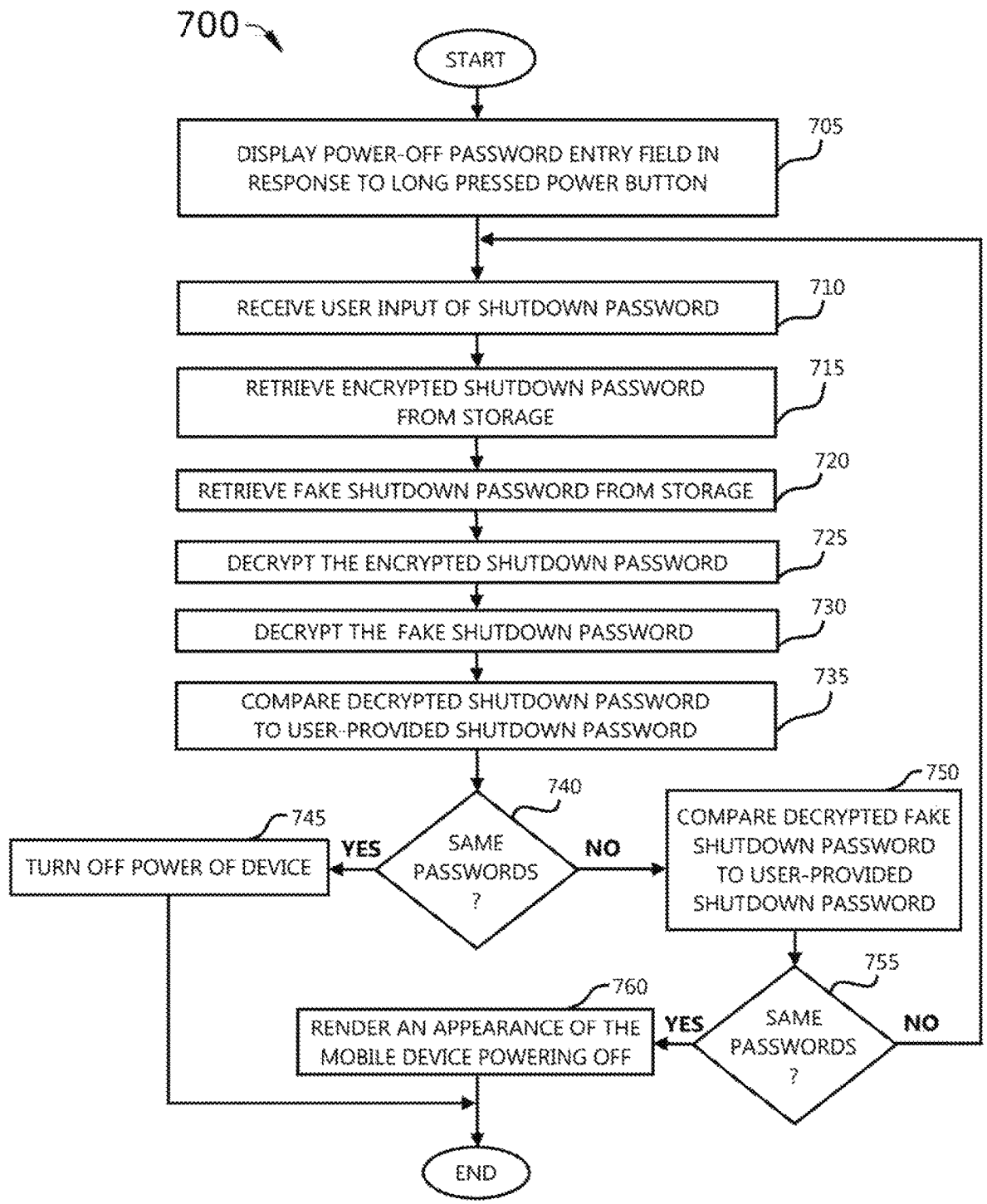
FIG. 7 conceptually illustrates a password-based fake mobile device shutdown process for rending an appearance of shutting down when powering off of the mobile device is attempted with a fake password in some embodiments.

By way of example, FIG. 7 conceptually illustrates a password-based fake mobile device shutdown process 700 for rending an appearance of shutting down when powering off of the mobile device is attempted with a fake password. A fake powering off sequence can fool the unauthorized person when he/she tried to turn off the mobile device with the wrong password. That is the device looks "off" but it is actually "on" to allow a time window for the mobile device to be located.

As shown in this figure, the password-based fake mobile device shutdown process 700 starts upon a power button or switch of the mobile device being long pressed in an attempt to power off the mobile device. Alternatively, a user of the mobile device can attempt to shut down the mobile device by using a graphical option in the UI of the mobile device (instead of long pressing the power switch).

In some embodiments, the password-based fake mobile device shutdown process 700 triggers visual output (at 705) of a power off password entry graphical display on a screen of the mobile device. Next, the password-based fake mobile device shutdown process 700 receives (at 710) a user-provided shutdown password, as entered by the user in the power off password entry graphical display. Next, the password-based fake mobile device shutdown process 700 retrieves (at 715) the encrypted shutdown password from the device storage.

In addition to retrieving the encrypted shutdown password, the password-based fake mobile device shutdown process 700 of some embodiments retrieves (at 720) a fake shutdown password from device storage. The fake shutdown password is encrypted when stored in the device storage. The fake shutdown password is configured in a manner similar to the configuration of the shutdown password. The fake shutdown password is intended to provide a level of security in the event that an assailant or another unauthorized person forces a rightful mobile device user to enter the shutdown password. However, when the fake shutdown password is entered, an appearance of powering off the mobile device is rendered. Nevertheless, to use a fake shutdown password, the user of the mobile device first configures the fake password (in Settings|Security|Fake Shutdown Password) and stores the fake password on the device.

Next, the password-based fake mobile device shutdown process 700 decrypts (at 725) the encrypted shutdown password and then decrypts (at 730) the fake shutdown password. After retrieval and decryption of the shutdown password and the fake shutdown password, the password-based fake mobile device shutdown process 700 compares (at 735) the decrypted shutdown password to the user-provided password.

In some embodiments, the password-based fake mobile device shutdown process 700 then determines (at 740) whether the decrypted shutdown password is the same as the user-provided password. When the decrypted shutdown password is the same as the user-provided shutdown password, the password-based fake mobile device shutdown process 700 turns off (at 745) the power of the mobile device. Then the password-based fake mobile device shutdown process 700 ends.

On the other hand, when the password-based fake mobile device shutdown process 700 determines (at 740) that the decrypted shutdown password is not the same as the user-provided password, the password-based fake mobile device shutdown process 700 compares (at 750) the decrypted fake shutdown password to the user-provided shutdown password. In some embodiments, the password-based fake mobile device shutdown process 700 determines (at 755) whether the decrypted shutdown password is the same as the user-provided shutdown password. When the decrypted shutdown password is not the same as the user-provided shutdown password, then the password-based fake mobile device shutdown process 700 transitions back to step 710, which was described in greater detail above. On the other hand, when the decrypted shutdown password is the same as the user-provided shutdown password, then the password-based fake mobile device shutdown process 700 renders (at 760) an appearance of the mobile device being powered off. Then the password-based fake mobile device shutdown process 700 ends.

Figure 8:
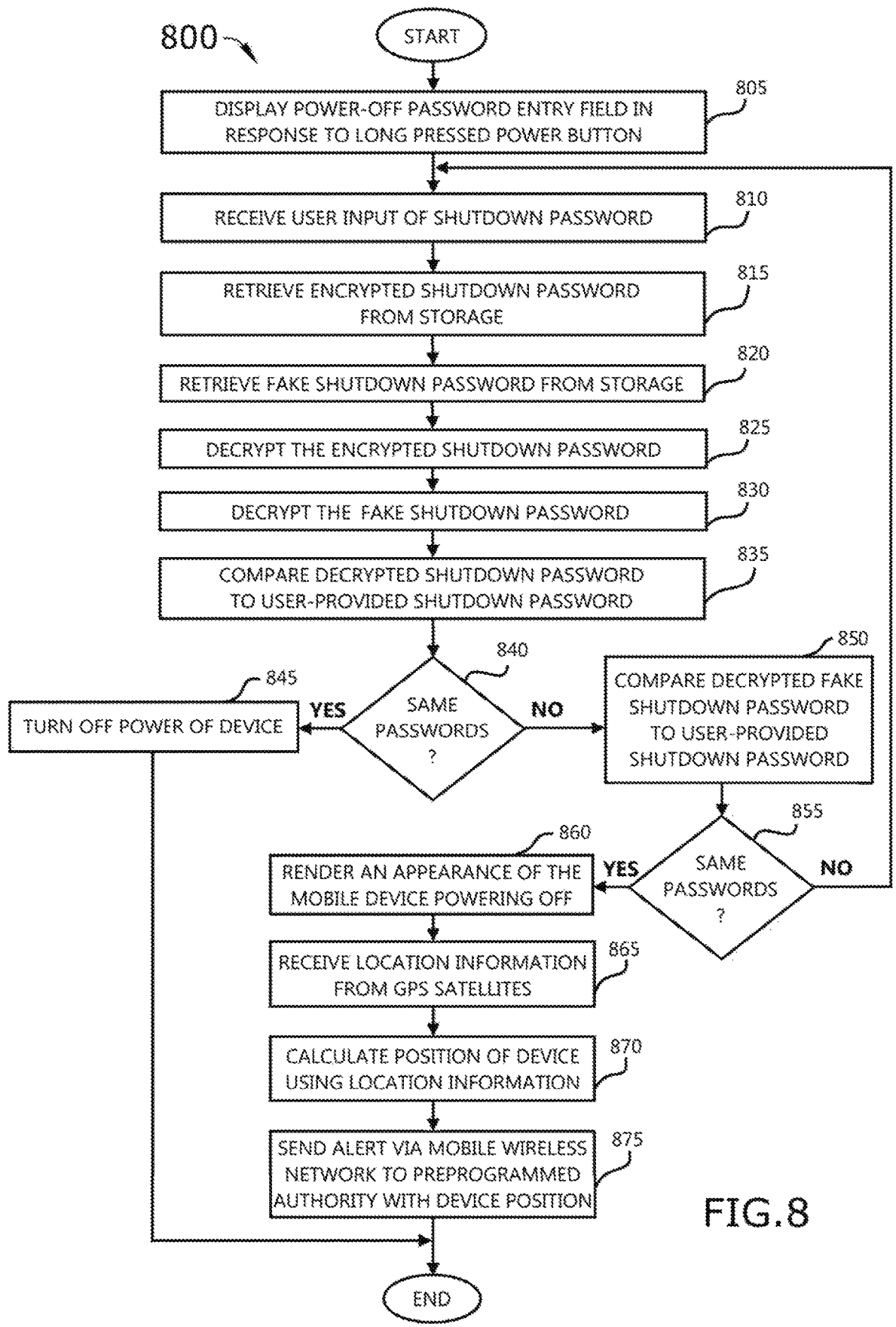
FIG. 8 conceptually illustrates a password-based alert signaling fake mobile device shutdown process for sending a wireless alert signal to an authority while rending an appearance of shutting down when powering off of the mobile device attempted with a fake password in some embodiments.

Turning now to FIG. 8, which conceptually illustrates a password-based alert signaling fake mobile device shutdown process 800 for sending a wireless alert signal to an authority while rending an appearance of shutting down when powering off of the mobile device is attempted with a fake password. As shown in this figure, the password-based alert signaling fake mobile device shutdown process 800 starts upon a power button or switch of the mobile device being long pressed in an attempt to power off the mobile device. Alternatively, a user of the mobile device can attempt to shut down the mobile device by using a graphical option in the UI of the mobile device (instead of long pressing the power switch). Thus, in some embodiments, the password-based alert signaling fake mobile device shutdown process 800 triggers visual output (at 805) of a power off password entry graphical display on a screen of the mobile device. Next, the password-based alert signaling fake mobile device shutdown process 800 receives (at 810) a user-provided shutdown password, as entered by the user in the power off password entry graphical display.

In some embodiments, the password-based alert signaling fake mobile device shutdown process 800 retrieves (at 815) the encrypted shutdown password from the device storage. Next, the password-based alert signaling fake mobile device shutdown process 800 of some embodiments retrieves (at 820) a fake shutdown password from device storage. The fake shutdown password is encrypted when stored in the device storage. The fake shutdown password is configured in a manner similar to the configuration of the shutdown password. The fake shutdown password is intended to provide a level of security in the event that an assailant or another unauthorized person forces a rightful mobile device user to enter the shutdown password. However, when the fake shutdown password is entered, an alert is sent to the proper authorities (e.g., police, etc.). But to use a fake shutdown password, the user of the mobile device first configures the fake password (in Settings Security Fake Shutdown Password) and stores the fake password on the device.

Next, the password-based alert signaling fake mobile device shutdown process 800 decrypts (at 825) the encrypted shutdown password and then decrypts (at 830) the fake shutdown password. After retrieval and decryption of the shutdown password and the fake shutdown password, the password-based alert signaling fake mobile device shutdown process 800 compares (at 835) the decrypted shutdown password to the user-provided password.

In some embodiments, the password-based alert signaling fake mobile device shutdown process 800 then determines (at 840) whether the decrypted shutdown password is the same as the user-provided password. When the decrypted shutdown password is the same as the user-provided shutdown password, the password-based alert signaling fake mobile device shutdown process 800 turns off (at 845) the power of the mobile device. Then the password-based alert signaling fake mobile device shutdown process 800 ends.

On the other hand, when the password-based alert signaling fake mobile device shutdown process 800 determines (at 840) that the decrypted shutdown password is not the same as the user-provided password, the password-based alert signaling fake mobile device shutdown process 800 compares (at 850) the decrypted fake shutdown password to the user-provided shutdown password. In some embodiments, the password-based alert signaling fake mobile device shutdown process 800 then determines (at 855) whether the decrypted shutdown password is the same as the user-provided shutdown password. When the decrypted shutdown password is not the same as the user-provided shutdown password, then the password-based alert signaling fake mobile device shutdown process 800 transitions back to step 810, which was described in greater detail above. On the other hand, when the decrypted shutdown password is the same as the user-provided shutdown password, then the password-based alert signaling fake mobile device shutdown process 800 renders (at 860) an appearance of the mobile device being powered off.

In some embodiments, the password-based alert signaling fake mobile device shutdown process 800 then receives (at 865) location information from GPS satellites. The number of satellites from which location information is received includes at least four GPS satellites. Based on the location information received from the GPS satellites, the password-based alert signaling fake mobile device shutdown process 800 calculates (at 870) a position of the mobile device. In some embodiments, the password-based alert signaling fake mobile device shutdown process 800 then sends (at 875) an alert via mobile wireless network to a pre-programmed authority, along with the calculated position of the device. In some embodiments, the password-based alert signaling fake mobile device shutdown process 800 ends.

Figure 9:
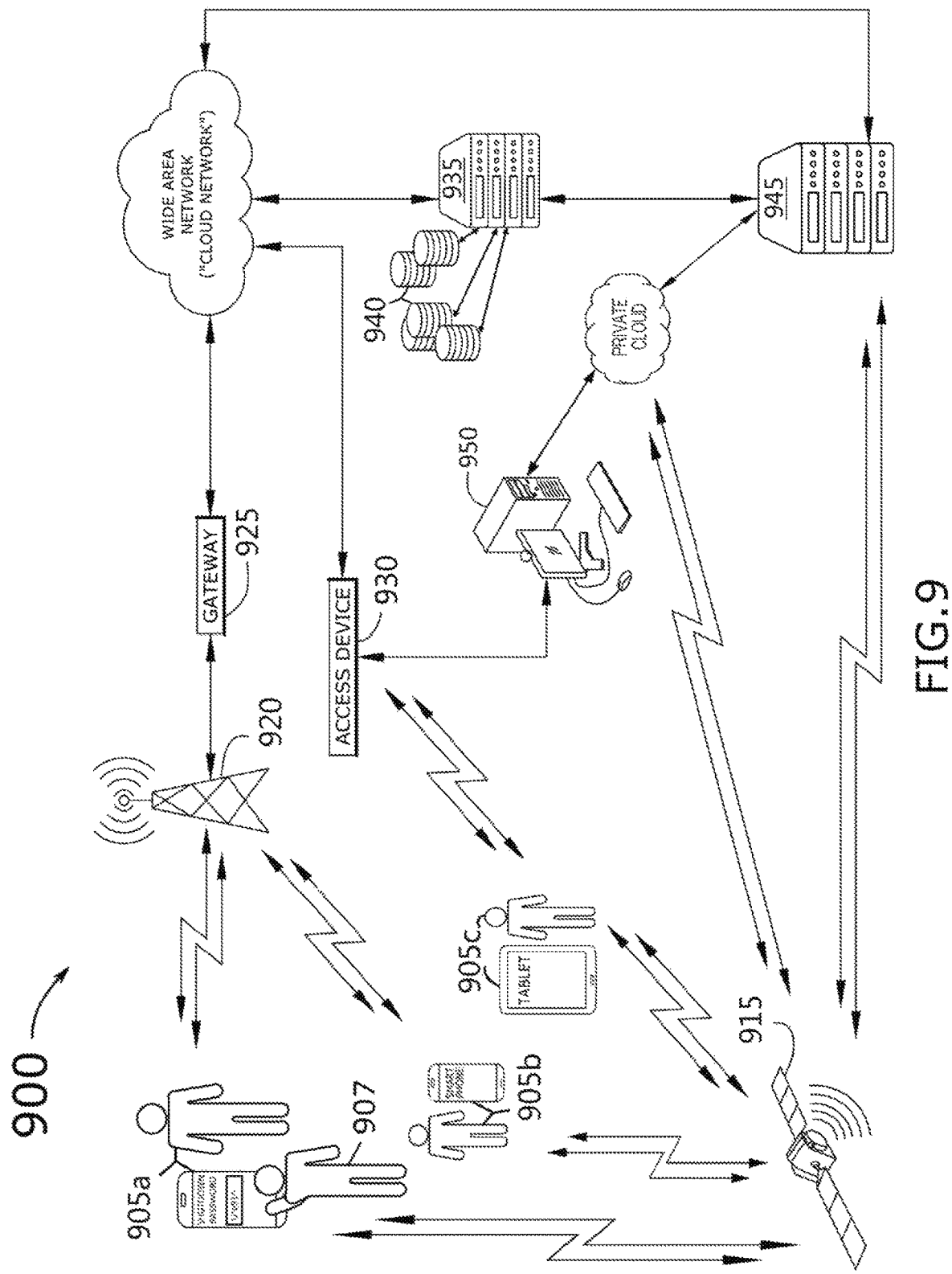
FIG. 9 conceptually illustrates a network architecture of an authentication-based mobile device powering off system that prevents unauthorized powering off of a mobile device in order to track location of the mobile device in some embodiments.

In another example, FIG. 9 conceptually illustrates a network architecture of an authentication-based mobile device powering off system 900 that prevents unauthorized powering off of a mobile device in order to track location of the mobile device. As shown in this figure, the authentication-based mobile device powering off system 900 involves a plurality users with mobile devices 905a-905c. Specifically, the plurality of users with mobile devices 905a-905c includes (i) a first user with mobile device 905a who is being forced to enter the shutdown password for the mobile device by an assailant or otherwise unauthorized person 907, (ii) a second user with mobile device 905b who is permitted to use the mobile device 905b but not authorized to power off the mobile device 905b, yet is trying to shut down the mobile device 905b in contravention of an owner of the mobile device 905b, and (iii) a third user with a tablet mobile device 905c who is not permitted to use or shutdown the tablet mobile device 905c (e.g., a thief).

The authentication-based mobile device powering off system 900 also includes a GPS satellite 915 that provides real-time location information to the plurality of mobile devices 905a-905c. Only a single GPS satellite 915 is shown in the authentication-based mobile device powering off system 900 of this example in order not to obscure the drawings and unnecessarily complicate the description of the authentication-based mobile device powering off system 900. However, it is understood that the GPS satellite 915 represents a plurality of at least four GPS satellites which collectively provide each mobile device 905a-905c with sufficient location and time information (i.e., the location of each satellite and the time of each satellites' broadcast transmission of the location data) from which to accurately calculate a position (or geo-position) of the respective mobile device.

Each of the mobile devices 905a-905c includes a systematic authentication-based mobile device powering off option to prevent unauthorized powering off of the mobile device. In this regard, each of the mobile devices 905a-905c performs an authenticated powering offer validation check before any power of the mobile device is turned off. In this way, only authorized users can shut down the mobile device.

Each of the mobile devices 905a-905c may further include an embedded software module that retrieves the device position information (calculated based on the satellite time and location data received from the GPS satellites 915). Furthermore, the embedded software module routinely transmits location information to the authentication-based mobile device powering off system 900, so that the user's present location is continually known by the authentication-based mobile device powering off system 900 and can be cross-compared to area permissions configured by mobile device owners (such as parents, parole officers, etc.) which define boundaries of physical travel by users of the mobile devices. Thus, when a mobile device goes missing, or is stolen, the owner or permitted user of the mobile device has time to track the location of the lost or stolen device in order to try and retrieve it. Similarly, when a minor or other custodial user of the mobile device tries (but fails) to shut down the mobile device in order to travel outside a permitted boundary, an owner, parent, or legal guardian is able to track the location of the user in real-time, and thereby ensure safety and enforce rules.

In some embodiments, the authentication-based mobile device powering off system 900 includes several back-end components that enable users to use emergency and alert features when in distress or when a situation compromises the safety of a rightful mobile device user. For example, the first user with mobile device 905a who is being forced to enter the shutdown password for the mobile device by an assailant or otherwise unauthorized person may not be in a position to deny the unauthorized person's demands. However, the first user can enter a fake password, if one was configured during set-up or sometime after. When a fake password is entered, the mobile device 905a appears to shut down as normal. In some embodiments, even long-pressing the power switch after the mobile device 905a has appeared to shutdown will trigger a fake start up sequence for the mobile device 905a which appears to be functionally powering up the mobile device 905a. In this way, the first user's safety is better protected, yet the mobile device 905a itself would have never lost power. In these situations (especially), the back-end components of the authentication-based mobile device powering off system 900 are essential for the safety of the user.

Specifically, the back-end components of the authentication-based mobile device powering off system 900 include at least a communication tower 920 and gateway 925, a network access device 930, one or more mobile device tracking authority systems 935 (such as a commercial provider of location tracking, emergency relay response provisioning, etc.), several data sources 940 (including, without limitation, mobile device user configurations, geofence area configurations associated with individual permitted users, tracking history of mobile devices, history of unauthorized mobile device attempted shutdowns, etc.) accessed by the mobile device tracking authority systems 935, emergency provider systems 945 associated with local police, ambulance, fire, etc., an emergence response system 950 (such as '911' emergency calls triggered by fake password entry) with direct access to local authorities, such as police, etc., via private cloud connection to the emergency provider system 945.

The present invention may be embodied within a system, a method, a computer program product or any combination thereof. The computer program product may include a non-transitory computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
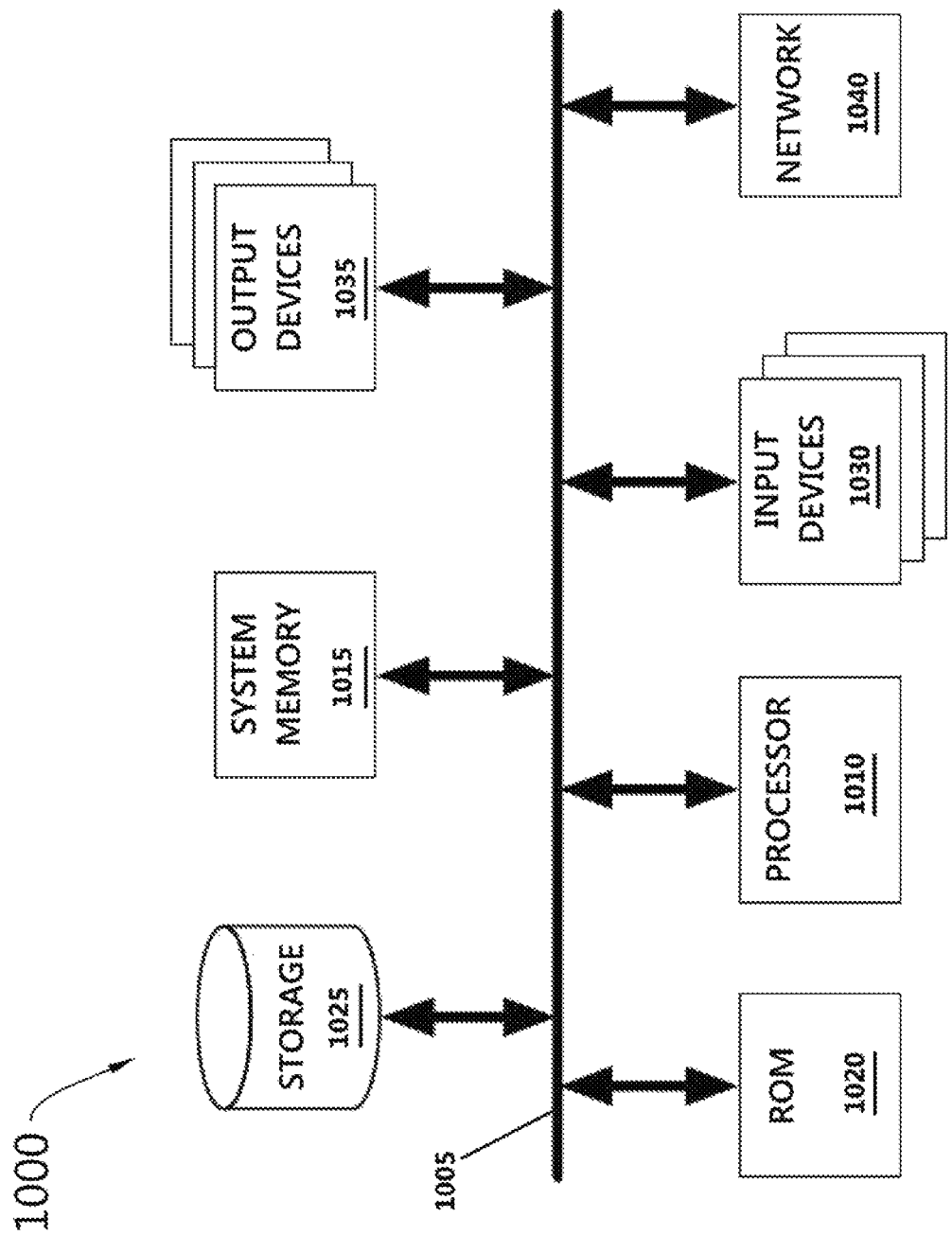
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer, phone, PDA, or any other sort of electronic device. Such an electronic system includes various types of computer readable media and interfaces for various other types of computer readable media. Electronic system 1000 includes a bus 1005, processing unit(s) 1010, a system memory 1015, a read-only 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only 1020, the system memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk or a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only 1020. For example, the various memory units include instructions for processing appearance alterations of displayable characters in accordance with some embodiments. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as cathode ray tubes (CRT) or liquid crystal displays (LCD). Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-3, 5, 7, and 8 conceptually illustrate processes. The specific operations of the processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, performs authentication of a shutdown password associated with a power-off operation of a mobile device, said program comprising sets of instructions for:
   receiving an input password at a graphical shutdown password entry field displayed on a screen of a mobile device to proceed with one of powering off the mobile device and rendering an appearance of powering off the mobile device;
   retrieving a plurality of encrypted passwords from an internal storage device of the mobile device, said plurality of encrypted passwords comprising an encrypted shutdown password and an encrypted fake shutdown password;
   decoding the plurality of encrypted passwords to render a plurality of decrypted passwords comprising a decrypted shutdown password and a decrypted fake shutdown password;
   comparing the input password to each of the decrypted shutdown password and the decrypted fake shutdown password;
   determining whether the input password matches one of the decrypted shutdown password and the decrypted fake shutdown password;
   determining whether to power off the mobile device when the input password matches one of the decrypted shutdown password and the decrypted fake shutdown password;
   proceeding with powering off the mobile device when the input password and the decrypted shutdown password are determined to be identical;
   rendering the appearance of powering off the mobile device without turning off power of the mobile device when the input password and the decrypted fake shutdown password are determined to be identical;
   receiving, at the mobile device, location information from GPS satellites;
   calculating a geophysical position of the mobile device based on the location information received from the GPS satellites; and
   sending a wireless message to a preprogrammed authority alerting the authority of an adverse emergency situation, said message including the geophysical position of the mobile device for the authority to dispatch emergency help to the geophysical position of the mobile device.

2. The non-transitory computer readable medium of claim 1, wherein the program further comprises a set of instructions for detecting a long pressing of a power switch of the mobile device.

3. The non-transitory computer readable medium of claim 1, wherein the program further comprises a set of instructions for visually outputting a power off option on a screen of the mobile device.

4. The non-transitory computer readable medium of claim 3, wherein the power off option comprises the graphical shutdown password entry field.

5. The non-transitory computer readable medium of claim 1, wherein the encrypted shutdown password is based on a shutdown password configuration set by one of an authorized user of the mobile device and an owner of the mobile device.

6. The non-transitory computer readable medium of claim 1, wherein the internal storage device of the mobile device is an encrypted internal storage device that is encrypted separately from and in addition to the encrypted passwords to prevent unauthorized access to the encrypted passwords stored in the encrypted internal storage device.

7. The non-transitory computer readable medium of claim 1, wherein sets of instructions for receiving location information from GPS satellites, calculating the geophysical position of the mobile device, and sending the wireless message to the preprogrammed authority are performed while maintaining a powered off appearance of the mobile device.

8. The non-transitory computer readable medium of claim 1, wherein sets of instructions for receiving location information from GPS satellites, calculating the geophysical position of the mobile device, and sending the wireless message to the preprogrammed authority are repeated at timed intervals to automatically inform the authority of the mobile device's geophysical position.

9. The non-transitory computer readable medium of claim 1, wherein the program further comprises a set of instructions for triggering a fake start up sequence of the mobile device when a long pressing of a power switch of the mobile device is detected and the mobile device is maintaining a powered off appearance after rendering the appearance of powering off the mobile device without turning off power of the mobile device.

10. The non-transitory computer readable medium of claim 1, wherein the decrypted shutdown password comprises an alpha-numeric password.

11. The non-transitory computer readable medium of claim 1, wherein the decrypted shutdown password comprises a hand-drawn password.

12. The non-transitory computer readable medium of claim 1, wherein the decrypted shutdown password comprises an iris scan password.

13. The non-transitory computer readable medium of claim 1, wherein the decrypted shutdown password comprises a fingerprint password.

\* \* \* \* \*